United States Patent
Rojanskiy et al.

(10) Patent No.: US 7,703,475 B2
(45) Date of Patent: Apr. 27, 2010

(54) PISTON FOR A LINEAR SPOOL VALVE

(75) Inventors: Henrikh Rojanskiy, Or Akiva (IL); Avraham Ophir, Herzliya (IL)

(73) Assignee: I.D.E. Technologies Ltd., Kadima (IL)

( * ) Notice: Subject to any disclaimer, the term of this patent is extended or adjusted under 35 U.S.C. 154(b) by 99 days.

(21) Appl. No.: 11/921,515

(22) PCT Filed: Jun. 6, 2006

(86) PCT No.: PCT/IL2006/000654

§ 371 (c)(1),
(2), (4) Date: Apr. 2, 2008

(87) PCT Pub. No.: WO2006/131913

PCT Pub. Date: Dec. 14, 2006

(65) Prior Publication Data

US 2009/0134082 A1    May 28, 2009

Related U.S. Application Data

(60) Provisional application No. 60/687,440, filed on Jun. 6, 2005.

(51) Int. Cl.
   *F16K 51/00* (2006.01)
(52) U.S. Cl. ........................ 137/375; 251/324
(58) Field of Classification Search ................. 251/324; 137/375
See application file for complete search history.

(56) References Cited

U.S. PATENT DOCUMENTS

| | | | |
|---|---|---|---|
| 3,227,174 A * | 1/1966 | Yost | 137/375 |
| 3,498,317 A * | 3/1970 | Duffey | 137/375 |
| 3,630,224 A * | 12/1971 | Kalvelage | 137/375 |
| 3,958,792 A | 5/1976 | Barkelew | |
| 4,021,016 A * | 5/1977 | Hart | 251/324 |
| 4,487,220 A * | 12/1984 | Hurst et al. | 137/375 |
| 4,572,233 A * | 2/1986 | Weeden | 137/375 |
| 4,612,955 A * | 9/1986 | Purvis | 137/375 |
| 5,029,608 A * | 7/1991 | Junier | 137/375 |
| 6,047,726 A * | 4/2000 | Kaneshige | 137/468 |

(Continued)

FOREIGN PATENT DOCUMENTS

EP    0 718 0775    7/1995

(Continued)

*Primary Examiner*—John Bastianelli
(74) *Attorney, Agent, or Firm*—The Nath Law Group; Derek Richmond

(57) ABSTRACT

A piston for a linear spool valve, the valve comprising a body having a inner surface. The body is made of a material with a relatively low heat expansion coefficient $\alpha_1$. The piston comprises a contact member having an outer surface and being adapted to reciprocate within the body of the valve so that the outer surface is in contact with the inner surface. The contact member has at least a first layer made of a material with a heat expansion coefficient $\alpha_2$ essentially greater than $\alpha_1$, i.e. $\alpha_2 \gg \alpha_1$, and at least a second layer made of a material with a heat expansion coefficient $\alpha_3$ close to $\alpha_1$. This causes the contact member to be adapted to behave, along said outer surface, as a material having a heat expansion coefficient essentially closer to $\alpha_1$ than to $\alpha_2$. One of the layers constitutes an outer layer of the contact member and comprises the outer surface.

22 Claims, 4 Drawing Sheets

U.S. PATENT DOCUMENTS

2004/0118455 A1* 6/2004 Welty et al. .................. 137/375
2004/0144946 A1* 7/2004 Sticht .......................... 251/324

FOREIGN PATENT DOCUMENTS

| EP | 0 884 509 | | 12/1998 |
|---|---|---|---|
| EP | 0 884 509 | A1 | 12/1998 |
| EP | 1 519 089 | A1 | 3/2005 |
| EP | 1519089 | | 3/2005 |
| JP | 7-180775 | A | 7/1995 |
| WO | 2004-111509 | | 12/2004 |
| WO | WO 2004-111509 | A1 | 12/2004 |

* cited by examiner

PISTON FOR A LINEAR SPOOL VALVE

This is a National Phase Application filed under 35 U.S.C. 371 as a national stage of PCT/IL20061000654 filed on Jun. 6, 2006, an application claiming the benefit under 35 USC 119(e) U.S. Provisional Application No. 60/687,440 filed on Jun. 6, 2005, the content of each of which is hereby incorporated by reference in its entirety.

FIELD OF THE INVENTION

This invention relates to valve pistons, more particularly, ones used in linear spool valves.

BACKGROUND OF THE INVENTION

A linear spool valve is a device commonly employed in work exchangers to obtain energy from one fluid stream and transfer that energy to another stream. It functions as a pump driven by fluid flow, and it normally comprises a body with a cylindrical cavity with an inner surface and piston adapted to reciprocate within the cavity in contact with the inner surface. Most known pistons are made of solid polymer material (not metal) in order to avoid intensive wear and tear of the valve body, which is normally made of steel.

Linear spool valves are often used in work exchangers for recovery of energy in reverse osmosis processes such as desalination. One example of such spool valve is disclosed in the Applicant's WO04111509. The use in reverse osmosis desalination imposes certain limitations on the valve's design because such processes often take place under high pressure differential between two ends of the piston and high temperature range. In particular, in course of a year, the seawater temperature is changed as a rule in a range from 10 to 35° C. The pressure across the piston is usually around 65-70 bars on one end of the piston and 1-2 bars on the other end of the piston. In order to withstand such pressure and temperature conditions, a very small clearance is allowed between the piston and the inner surface of the valve, which is preferably not greater than about 0.06 mm.

SUMMARY OF THE INVENTION

According to one aspect of the present invention there is provided a piston for a linear spool valve, said valve comprising a body having a inner surface and made of a material with a low heat expansion coefficient $\alpha_1$; said piston comprising a contact member having an outer surface, and being adapted to reciprocate within the body of said valve so that said outer surface is in contact with said inner surface; said contact member having at least a first layer made of a material with a heat expansion coefficient $\alpha_2$ essentially greater than $\alpha_1$, i.e. $\alpha_2 \gg \alpha_1$, and a second layer made of a material with a heat expansion coefficient $\alpha_3$ close to $\alpha_1$, i.e. $\alpha_3 \approx \alpha_1$, one of these layers constituting an outer layer of the contact member and comprising said outer surface; whereby said contact member is adapted to behave, along said outer surface, as a material having a heat expansion coefficient essentially closer to $\alpha_1$ than to $\alpha_2$.

One of the first and second layers, which does not constitute the outer layer, may be co-extensive with the outer layer or may extend along the majority thereof.

The materials having heat expansion coefficients $\alpha_2$ and $\alpha_3$ may be chosen such as to maintain a predetermined gap between the outer surface of said contact member and the inner surface of said valve, throughout entire temperature and pressure work range of said valve. This gap may be in the range of 0.03 mm and preferably not greater than about 0.06 mm.

The outer layer may be made of a material which is chosen such, that the friction between said material and said inner surface is essentially low, whereby during the operation of the piston, essentially greater wear and tear is caused to said outer layer, than to said inner surface of the valve, and thus be replaceable. Furthermore, the outer layer may be made of a plastic material.

One advantage of the above design of the piston of the present invention is that it compensates the difference in heat expansion coefficients between the materials of which the piston and valve body are made, and allows the gap between the piston and valve body not to vary significantly, thereby avoiding leakage and cavitations, or unduly strong friction and wear, or even jamming of the piston during its operation.

The use of the linear spool valve with the above piston in reverse osmosis systems may allow maintaining said gap at temperatures ranging from 10 to 35° C., and under pressure conditions of up to 65-70 bars on a first end of the piston (high pressure end) and 1-2 bars on a second end of the piston (low pressure end).

The contact member may be mounted on a shaft, said shaft being adapted to be connected to an actuator in order to provide said reciprocation.

According to one embodiment, the contact member may comprise a sleeve constituting said second layer, which may be made for example, of steel. The outer layer may be constituted by said first layer, and mounted on said sleeve with interference fit.

The piston may further comprise a hub mounted on the shaft, wherein said contact member is mounted on said hub, being spaced thereby from the shaft.

The hub may comprise an inner member which is essentially axially shorter than the sleeve, and which is disposed adjacent to the second, low pressure end of the piston, to create a cavity defined between the inner member and the sleeve. In this case, the piston may further comprise a cover mounted on the shaft adjacent the first, high pressure end of the piston, to close said cavity. The cover may be formed with through-going apertures providing fluid communication between said cavity and the external environment of the piston adjacent to said first end. In this case, the inner member and said cavity, when filled with fluid, constitute said hub. The fluid in the cavity and the fluid communication between the cavity and the external environment are used for equalizing pressure between said cavity and said environment, thus providing radial and axial support for said contact member.

Alternatively, the hub may comprise an inner member coextensive with said contact member to provide the required radial and axial support thereto. In this case, no cavity is formed and the cover may be formed without said apertures.

According to another embodiment, the contact member may comprise a hub constituting said first layer and mounted on the shaft. The outer layer may be constituted by said second layer, and may be mounted on the hub. The outer layer may be made of a plastic material having a heat expansion coefficient $\alpha_3$ as mentioned above.

According to other aspects of the present invention, there are provided a linear spool valve comprising a valve body and a piston as described above, and a system for reverse osmosis desalination, comprising such valve.

BRIEF DESCRIPTION OF THE DRAWINGS

In order to understand the invention and to see how it may be carried out in practice, several embodiments will now be described, by way of a non-limiting example only, with reference to the accompanying drawings, in which:

FIG. 1A is an enlarged detail A in FIG. 1;

DETAILED DESCRIPTION OF EXEMPLARY EMBODIMENTS

Figure 1:
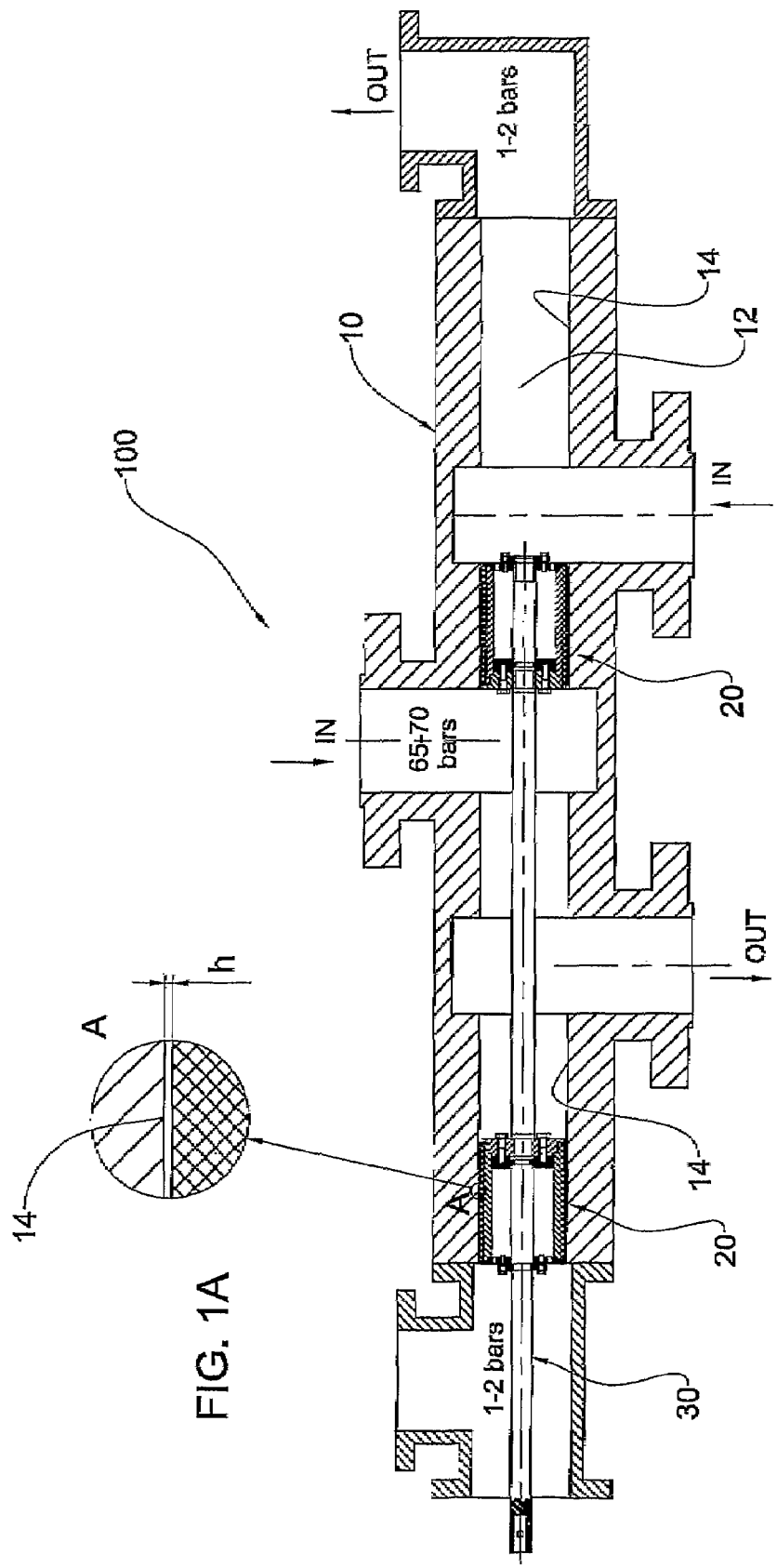
FIG. 1 is a schematic cross-sectional view of a linear spool valve comprising a piston according to the present invention.

FIG. 1 illustrates a linear spool valve, generally designated as 100, comprising a body 10 formed with a main channel 12, and two pistons 20 mounted on a main shaft 30 adapted for reciprocation therein along a main axis X-X. The body 12 is made of stainless steel having a heat expansion coefficient $\alpha_1$ of about $14 \times 10^{-6}$ [1/C.°]. The valve is adapted for use in a water desalination system. During operation of the valve, the pressure on a first end of the piston is 65-70 bars, and the pressure on the second end of the piston is 1-2 bars (the first end and second ends of the piston will thus be referred to below as respective high and low pressure ends). The temperature of the water circulating within the valve 100, may vary in course of a year from 10 to 35° C.

The channel 12 of the valve body 10 has an inner surface 14, and FIG. 1A is an enlarged illustration of the contact area between the piston and this inner surface showing a clearance $h$ therebetween, which may be in the order of 0.03 mm and is preferably not greater than 0.06 mm.

Figure 2:
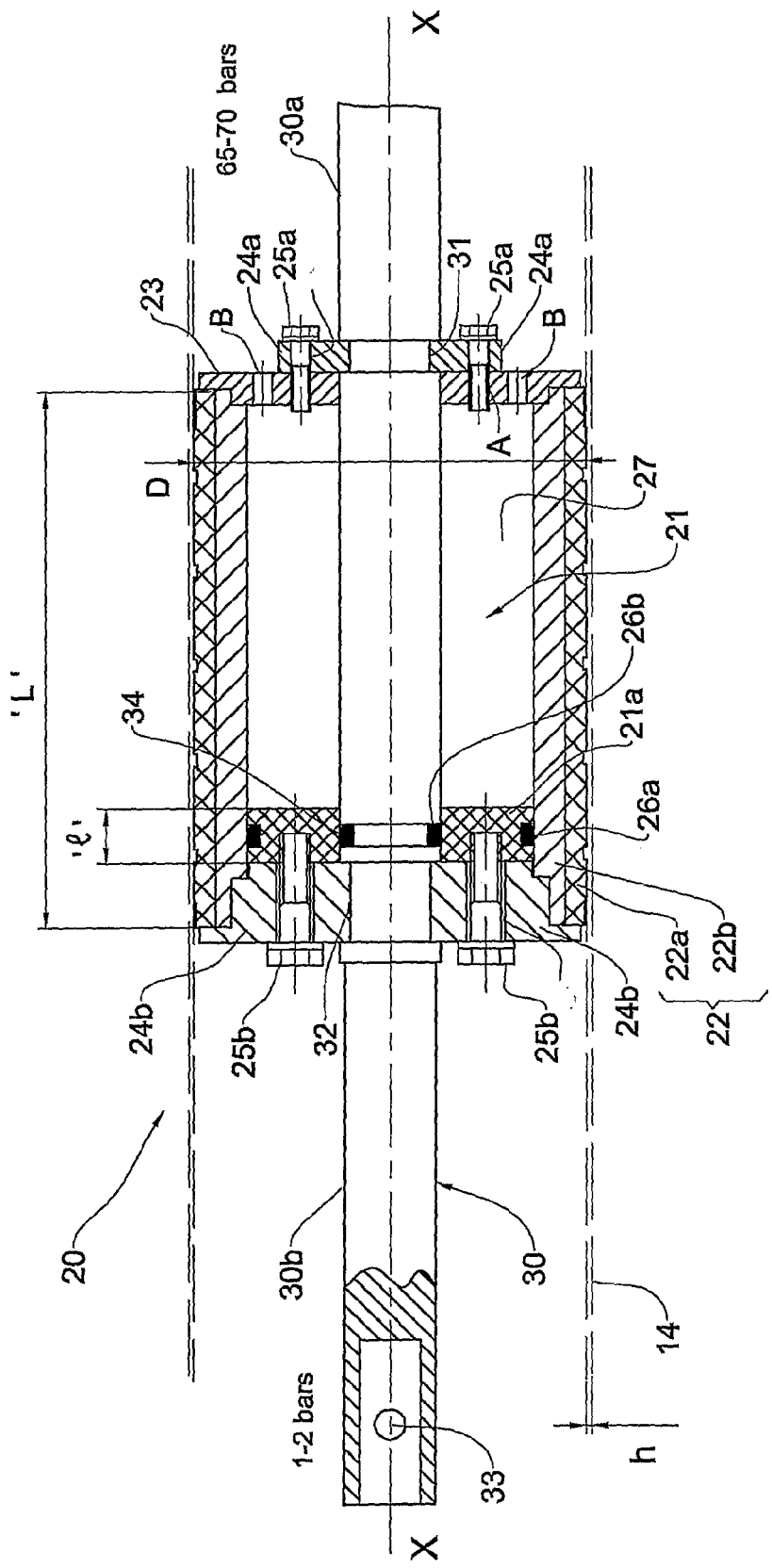
FIG. 2 is a schematic cross-sectional view of the piston of FIG. 1 according to one example of the present invention.

FIG. 2 is a more detailed illustration of the piston 20. The piston 20 is mounted on a main shaft 30 and has an overall diameter 'D'. The piston 20 comprises a hub 21 and a contact member 22 mounted thereon.

The hub 21 comprises and inner member 21a mounted directly on the shaft 30 at its low pressure end. The inner member 21a, is made from a plastic material such as POM-C, having a heat expansion coefficient $\alpha_2$ of about $100 \times 10^{-6}$ [1/C.°], which is 5-10 times greater than that of the stainless steel of which the valve body 10 is made.

The contact member 22 comprises an outer layer 22a and a sleeve 22b. The outer layer 22 is mounted onto the sleeve 22b with an interference fit.

The outer layer 22a is also made from a plastic material such as POM-C, having a heat expansion coefficient $\alpha_2$ of about $100 \times 10^{-6}$ [1/C.°], which is 5-10 times greater than that of stainless steel.

The sleeve 22b is made, for example, of stainless steel, having a heat expansion $\alpha_3$ of about $14 \times 10^{-6}$ [1/C.°], which is similar to that of the steel inner surface 14 of the valve body 10 (FIG. 1).

An O-ring seal 26a is positioned between the inner member 21a and the sleeve 22b, and it is adapted to compensate for the differences in heat expansion coefficients therebetween.

The inner member 21a has a longitudinal extension 'l' along the main axis X-X of the piston, which is essentially shorter in length than the longitudinal extension "L" of the contact member 22. This results in a cavity 27 being formed between the inner member 21a, the sleeve 22b and the shaft 30.

The piston further comprises a cover 23 mounted on the shaft at the high pressure end of the piston, a first pair of semi-rings 24a mounted on the main shaft 30 into a recess 31 therein at the same end of the piston 20, and a second pair of semi-rings 24b mounted on the main shaft 30 into a recess 32 therein formed at the low pressure end of the piston. The semi-rings 24 are adapted to provide radial and axial support for the contact member 22, as well as to close at least one end of the piston 20. Each of the semi-rings 24 is equipped with utility holes adapted to receive therethrough bolts 25 in order to connect the semi-rings either to the inner member 21a or to the cover 23.

Since the inner member 21a is essentially shorter than the sleeve 22b, the sleeve and the outer layer 22a are supported at both ends by the cover 23 and semi-rings 24a.

The cover 23 and the semi-rings 24a and 24b are made of steel, similar to that of the valve body 10, and is also formed with utility holes adapted to receive bolts 25a therethrough in order to connect the cover 23 to the semi-rings 24a. The cover 23 is further formed with through-going apertures B in fluid communication with the cavity 27.

The outer layer 22a and the sleeve 22b are formed and arranged such that the cover 23 and the set of semi-rings 24a and 24b may be mounted onto the main shaft 30 and fitted against the ends of the piston 20, to provide radial and axial support thereto.

An annular ring 26b, made of seawater resistant elastic material such as rubber, is mounted into a recess 34 between the main shaft 30 and the hub unit 21, and is used for sealing purposes.

The shaft 30 on which the piston 20 is mounted, is adapted to be connected to an actuator (not shown) through connection point 33, in order to provide the reciprocation.

The material of the outer layer 22a is chosen to have a low friction with the inner surface 14, to overcome damaging effects which take place in know plastic pistons as the water temperature decreases and increases, and the valve body 10 and the piston 20, are forced to shrink and expand respectively.

In regular plastic pistons, this effect is likely to cause either too large a gap between the outer layer of a piston and the inner surface of a valve body, or a very strong friction between the piston and the valve body. These phenomena may lead to a number of damaging effects. A large gap as such, is likely to cause leakage of water from one end of the piston to the other, resulting in losses and less efficient overall work of the valve. Too strong friction between the outer layer and the inner surface is likely to cause substantial wear to the outer layer, requiring replacement of the piston, resulting in a costly overall maintenance of the valve. Furthermore, strong friction may even cause jamming of the piston within the valve body.

Due to the specific choice of the material of the outer layer 22a in the valve 100 and the piston 20, as described above, essentially greater wear and tear is caused to the outer layer 22a than to the inner surface 14 of said valve body 10. This prevents, inter alia, the jamming of the piston and also allows the outer layer 22a to be replaceable.

In addition, the above mentioned effects, such as leakage and jamming of the piston, are prevented in the valve 100 as described above, since the heat expansion coefficients of the material of the body 10 of the valve and effective heat expansion coefficient of the contact member 22 are essentially similar, and since there is an interference fit between the outer layer 22a and the sleeve 22b. This similarity, facilitated by the interference fit, causes the expansion of the outer layer 22a to be dependent mainly on the expansion of the sleeve 22b, rather than on the heat expansion coefficient of the material of which the outer layer 22a is made. This results in the contact member 22 having the effective heat expansion coefficient as mentioned above, i.e. behaving as if it is formed of one material having a heat expansion coefficient similar to that of the material of which the valve body 10 is made.

Furthermore, since the apertures B of the cover 23 are in fluid communication with the cavity 27, the pressure within the cavity is equalized to the pressure of the environment on the high pressure end of the piston, i.e. about 65-70 bars, bearing most of the radial and axial forces exerted on the contact member 22 thus allowing the use of an essentially short inner member 21a.

This allows maintaining a predetermined gap between the outer layer 22a and the inner surface 14 of the valve body 10. The desired gap is usually predetermined to be not greater 0.06 mm, e.g. in the range of 0.03 mm, and depends mostly on the diameter of the piston 20. In the present example, such a gap correlates to a diameter 'D' of about 200-250 mm. It should be understood that different diameters would require different predetermined gaps. Furthermore, this arrangement allows the use of an essentially thin sleeve 22b, thus reducing the overall manufacturing, assembly and maintenance costs of the piston 20.

Figure 3:
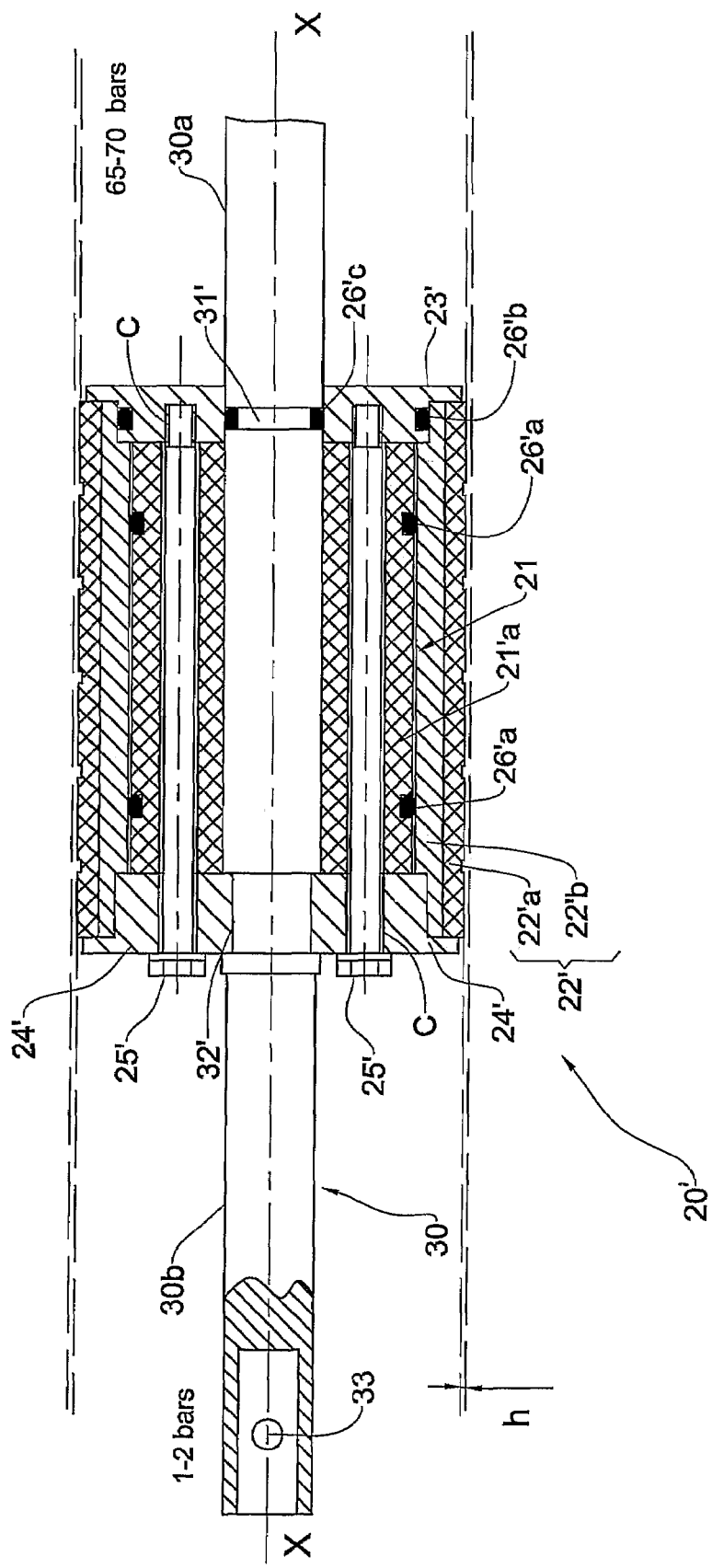
FIG. 3 is a schematic cross-sectional view of the piston of FIG. 1 according to another example of the present invention.

FIG. 3 is a detailed illustration of a piston 20', having a design different from that of the piston 20 shown in FIGS. 1 and 2.

The piston 20' is mounted on a main shaft 30 and has an overall diameter 'D'. The piston 20' comprises a hub 21' and a contact member 22' mounted thereon.

The hub 21' comprises and inner member 21'a mounted directly on the shaft 30 at its low pressure end. The inner member 21'a is made from a plastic material such as POM-C, having a heat expansion coefficient $\alpha_2$ of about $100 \times 10^{-6}$ [1/C.°], which is 5-10 times greater than that of the stainless steel of which the valve body 10 is made.

The contact member 22' comprises an outer layer 22'a and a sleeve 22'b. The outer layer 22' is mounted onto the sleeve 22'b with an interference fit.

The outer layer 22'a is also made from a plastic material such as POM-C, having a heat expansion coefficient $\alpha_2$ of about $100 \times 10^{-6}$ [1/C.°], which is 5-10 times greater than that of stainless steel.

The sleeve 22'b is made, for example, of stainless steel, having a heat expansion $\alpha_3$ of about $14 \times 10^{-6}$ [1/C.°], which is similar to that of the steel inner surface 14 of the valve body 10 (FIG. 1).

Two rubber rings 26'a are positioned between the inner member 21'a and the contact member 22', adapted to compensate for the differences in heat expansion coefficients therebetween, by separating the inner member 21'a from the contact member 22', thus causing the entire contact member 22' to behave as if it is fully made of a material having a relatively low heat expansion coefficient, similar to $\alpha_1$.

The piston further comprises a cover 23' mounted on the shaft at one end of the piston, and a pair of semi-rings 24' mounted on the main shaft 30 into a recess 32' therein formed at the other end of the piston. The semi-rings 24' are adapted to provide radial and axial support for the contact member 22', as well as to close at least one end of the piston 20'. Each of the semi-rings 24' is equipped with utility holes adapted to receive therethrough bolts 25' in order to connect the semi-rings to the cover 23'.

The cover 23' and the semi-rings 24' are made of steel, similar to that of the valve body 10, and is also formed with utility holes adapted to receive bolts 25' therethrough in order to connect the cover 23' to the semi-rings 24'.

The outer layer 22'a and the sleeve 22'b are formed and arranged such that the cover 23' and the semi-rings 24'a may be mounted onto the main shaft 30 and fitted against the ends of the piston 20', to provide radial and axial support thereto.

An O-ring 26'b, manufactured from seawater resistant material such as rubber, is positioned between the cover 23' and the sleeve 22'b, and is used for sealing purposes. An additional O-ring 26'c, made of the same material, is mounted into a recess 31' between the main shaft 30 and the cover 23'.

The arrangement and structure of the piston 20' as described in this example of the invention, has similar advantages and is able to prevent the damaging effects described with respect to the piston 20.

Figure 4:
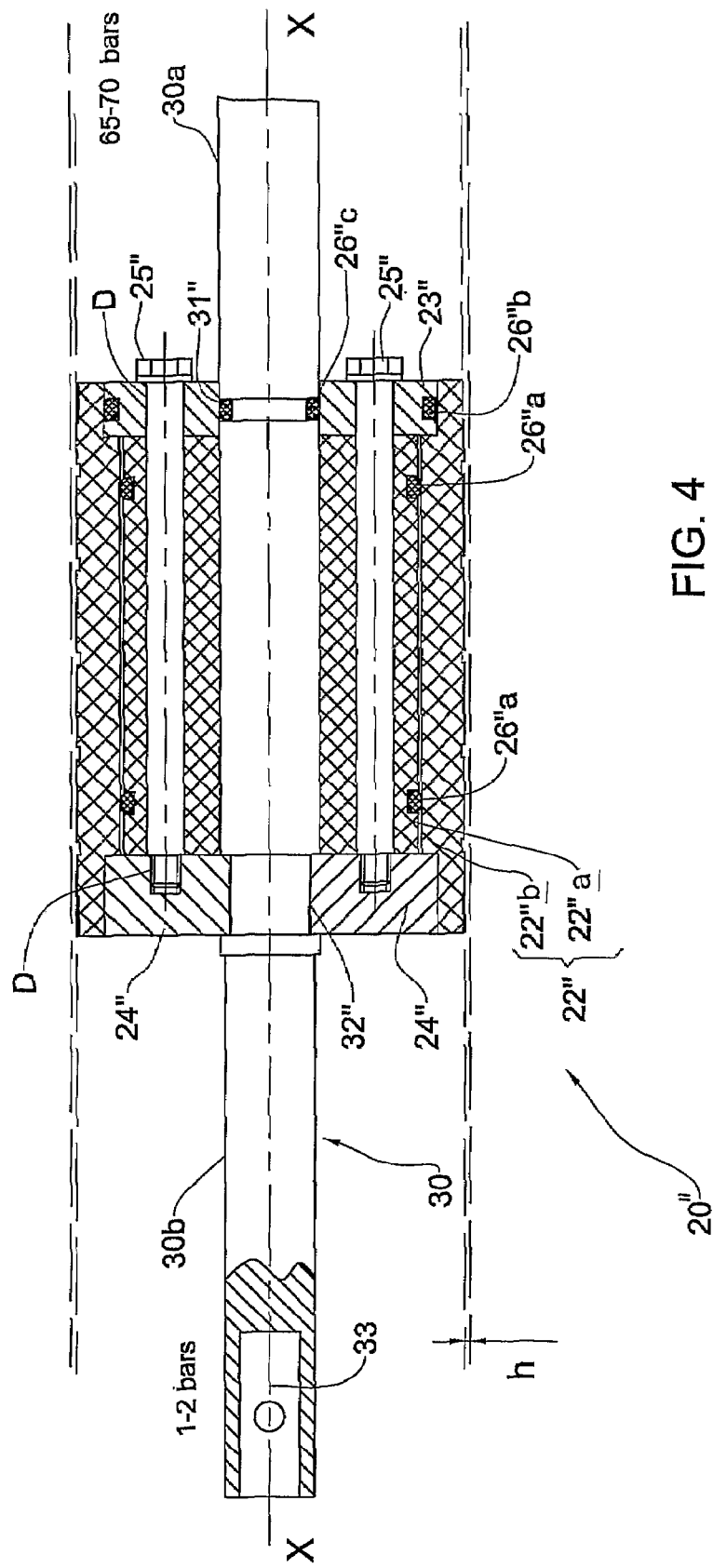
FIG. 4 is a schematic cross-sectional view of the piston of FIG. 1 according to a yet another example of the present invention.

FIG. 4 is a detailed illustration of the piston 20", having a design different from that of the pistons 20 and 20'. The piston 20" is mounted on a main shaft 30 and constitutes a contact member 22".

The contact member 22" comprises a hub 22"a and an outer layer 22"b. The outer layer 22"b is mounted on the hub 22"a.

The hub 22"a is made from a plastic material such as POM-C, having a heat expansion coefficient $\alpha_2$ of about $100 \times 10^{-6}$ [1/C.°], which is 5-10 times greater than that of stainless steel.

The outer layer 22"b is made, for example, of stainless steel, having a heat expansion $\alpha_3$ of about $14 \times 10^{-6}$ [1/C.°], which is similar to that of the steel inner surface 14 of the valve body 10 (FIG. 1).

Two rubber rings 26"a are positioned between the inner member 21"a and the contact member 22", adapted to compensate for the differences in heat expansion coefficients therebetween, by separating the hub 22"a from the outer layer 22"b, thus causing the entire contact member 22" to behave as if made of a material having a relatively low heat expansion coefficient, similar to $\alpha_1$.

The piston further comprises a cover 23" mounted on the shaft at one end of the piston, and a pair of semi-rings 24" mounted on the main shaft 30 into a recess 32" therein formed at the other end of the piston. The semi-rings 24" are adapted to provide radial and axial support for the contact member 22", as well as to close at least one end of the piston 20. Each of the semi-rings 24" is equipped with utility holes adapted to receive therethrough bolts 25" in order to connect the semi-rings to the cover 23".

The cover 23" and the semi-rings 24" are made of steel, similar to that of the valve body 10, and the cover is also formed with utility holes adapted to receive bolts 25" therethrough in order to connect the cover 23" to the semi-rings 24".

The hub 22"a and the outer layer 22"b are formed and arranged such that the cover 23" and the semi-rings 24"a may be mounted onto the main shaft 30 and fitted against the ends of the piston 20", to provide radial and axial support thereto.

An O-ring 26"b, manufactured from seawater resistant material such as rubber, is positioned between the cover 23" and the outer layer 22"b, and is used for sealing purposes. An additional O-ring 26"c, made of the same material, is mounted into a recess 31" between the main shaft 30 and the cover 23".

The arrangement and structure of the piston 20" as described in this example of the invention, has similar advantages and is able to prevent the damaging effects described with respect to the piston 20.

Those skilled in the art to which this invention pertains will readily appreciate that numerous changes, variations and modifications may be made without departing from the scope of the invention mutatis mutandis.

The invention claimed is:

1. A piston for a linear spool valve, said valve comprising a body having an inner surface and made of a material with a low heat expansion coefficient $\alpha_1$; said piston comprising a contact member having an outer surface, and being adapted to reciprocate within the body of said valve so that said outer surface is in contact with said inner surface; said contact member having at least a first layer made of a material with a heat expansion coefficient $\alpha_2$ essentially greater than $\alpha_1$, i.e. $\alpha_2 \gg \alpha_1$, and a second layer made of a material with a heat expansion coefficient $\alpha_3$ close to $\alpha_1$, i.e. $\alpha_3 \cong \alpha_1$, one of these layers constituting an outer layer of the contact member and comprising said outer surface; whereby said contact member is adapted to behave, along said outer surface, as a material having a heat expansion coefficient essentially closer to $\alpha_1$ than to $\alpha_2$.

2. A piston according to claim 1, wherein said contact member comprises a sleeve constituting said second layer, said outer layer being constituted by said first layer and mounted on said sleeve with interference fit.

3. A piston according to claim 2, further comprising a hub, wherein said contact member is mounted on said hub.

4. A piston according to claim 3, wherein said hub comprises an inner member which is essentially axially shorter than the sleeve, and is disposed adjacent to one end of the piston to create a cavity, defined between the inner member and the sleeve.

5. A piston according to claim 1, wherein said contact member comprises a hub constituting said first layer, said outer layer being constituted by said second layer, the outer layer being mounted on the hub.

6. A piston according to claim 1, wherein the materials having the heat expansion coefficients $\alpha_2$ and $\alpha_3$ are chosen such as to maintain a predetermined gap between said outer surface of said contact member and said inner surface, throughout entire temperature and pressure work range of said valve.

7. A piston according to claim 6, wherein said gap is maintained under pressure conditions of 65-70 bars on a first end of the piston and 1-2 bars on a second end of the piston.

8. A piston according to claim 6, wherein said gap is maintained at temperatures ranging from 10 to 35° C.

9. A piston according to claim 1, wherein said outer layer is made of a plastic material.

10. A piston according to claim 1, wherein said outer layer is made of a material which is chosen such, that the friction between said material and said inner surface is essentially low, whereby during the operation of the piston, essentially greater wear and tear is caused to said outer layer, than to said inner surface of the valve.

11. A piston according to claim 1, wherein said outer layer is adapted to be replaceable.

12. A piston according to claim 3, wherein said hub is adapted for being mounted on a main shaft.

13. A piston according to claim 12, wherein said shaft is adapted to be connected to an actuator for providing reciprocation of said piston.

14. A piston according to claim 5, wherein said second layer is made of a plastic material.

15. A piston according to claim 2, wherein said second layer is made of steel.

16. A piston according to claim 1, wherein said first layer is made of plastic material.

17. A piston according to claim 4, further comprising a cover mounted on said shaft adjacent the other end of the piston to close said cavity.

18. A piston according to claim 17, wherein said cover is formed with through-going apertures providing fluid communication between said cavity and external environment of the piston adjacent said other end, said inner member and said cavity, when filled with fluid, constituting said hub.

19. A piston according to claim 18, wherein said fluid communication is used for equalizing pressure between said cavity and said environment, to provide radial and axial support for said contact member.

20. A linear spool valve comprising a piston according to claim 1.

21. A linear spool valve according to claim 20, adapted for use in a work exchanger.

22. A system for reverse osmosis desalination comprising a linear spool valve according to claim 20.

* * * * *